United States Patent
Seo et al.

(10) Patent No.: US 11,456,453 B2
(45) Date of Patent: Sep. 27, 2022

(54) CATHODE ACTIVE MATERIAL, METHOD OF PREPARING THE SAME, AND LITHIUM SECONDARY BATTERY INCLUDING CATHODE INCLUDING THE SAME

(71) Applicant: SM LAB CO., LTD., Ulsan (KR)

(72) Inventors: Min Ho Seo, Gyeonggi-do (KR); Ji Young Kim, Ulsan (KR)

(73) Assignee: SM LAB CO., LTD., Ulsan (KR)

( * ) Notice: Subject to any disclaimer, the term of this patent is extended or adjusted under 35 U.S.C. 154(b) by 179 days.

(21) Appl. No.: 16/962,918

(22) PCT Filed: Dec. 26, 2019

(86) PCT No.: PCT/KR2019/018506
§ 371 (c)(1),
(2) Date: Jul. 17, 2020

(87) PCT Pub. No.: WO2020/171367
PCT Pub. Date: Aug. 27, 2020

(65) Prior Publication Data
US 2021/0218018 A1    Jul. 15, 2021

(30) Foreign Application Priority Data

Feb. 18, 2019   (KR) ...................... 10-2019-0018822

(51) Int. Cl.
*H01B 1/06*        (2006.01)
*H01M 4/36*       (2006.01)
(Continued)

(52) U.S. Cl.
CPC ............ *H01M 4/366* (2013.01); *C01G 53/42* (2013.01); *C01G 53/50* (2013.01); *H01B 1/06* (2013.01);
(Continued)

(58) Field of Classification Search
CPC ... H01B 1/00; H01B 1/06; H01B 1/08; H01B 1/10; H01M 4/366; H01M 4/525; H01M 4/62; C01G 53/42; C01G 53/50
See application file for complete search history.

(56) References Cited

U.S. PATENT DOCUMENTS

| | | | |
|---|---|---|---|
| 6,869,547 B2 * | 3/2005 | Barker ................ | H01M 4/505 252/519.1 |
| 6,962,666 B2 * | 11/2005 | Ravet ..................... | H01B 1/24 252/509 |

(Continued)

FOREIGN PATENT DOCUMENTS

| | | |
|---|---|---|
| JP | 2016-170942 A | 9/2016 |
| KR | 10-2010-0042145 A | 4/2010 |

(Continued)

OTHER PUBLICATIONS

English language machine translation of KR 1020080118935 (pub Jun. 2010).*

(Continued)

*Primary Examiner* — Mark Kopec
(74) *Attorney, Agent, or Firm* — Ware, Fressola, Maguire & Barber LLP

(57) ABSTRACT

Provided is a cathode active material including a core including a compound represented by Formula 1; and a coating layer including a phosphorus-containing compound disposed on a surface of the core:

$$Li_aZr_\alpha W_\beta M_{1-\alpha-\beta}O_{2-b}S_b \qquad \text{Formula 1}$$

In Formula 1, M, Zr, W, a, α, β, and b are the same as defined in relation to the present specification.

20 Claims, 12 Drawing Sheets

<COMPARATIVE EXAMPLE 1>

<EXAMPLE 1>

(51) Int. Cl.
   *C01G 53/00*      (2006.01)
   *H01M 4/525*      (2010.01)
   *H01M 4/62*       (2006.01)
   *H01M 10/0525*    (2010.01)
   *H01M 4/02*       (2006.01)

(52) U.S. Cl.
   CPC ............. *H01M 4/525* (2013.01); *H01M 4/62* (2013.01); *H01M 10/0525* (2013.01); *C01P 2002/52* (2013.01); *C01P 2002/72* (2013.01); *C01P 2004/03* (2013.01); *C01P 2004/04* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 9,337,479 B2* | 5/2016 | Miyazaki | H01M 4/364 |
| 9,972,826 B2 | 5/2018 | Kawakami et al. | |
| 11,024,846 B2* | 6/2021 | Xing | H01M 4/525 |
| 2021/0194000 A1* | 6/2021 | Uchiyama | H01M 4/0471 |

FOREIGN PATENT DOCUMENTS

| | | |
|---|---|---|
| KR | 10-2010-0060362 A | 6/2010 |
| KR | 10-2015-0055803 A | 5/2015 |
| KR | 10-2018-0133141 A | 12/2018 |
| WO | WO 2017/002057 A1 * | 1/2017 |

OTHER PUBLICATIONS

English language machine translation of KR 1020150055803 (application No. 1020130138230 pub May 2015).*
English language Abstract of KR10-2015-0055803A, (pub May 2015).
English language Abstract of KR10-2010-0060362, (pub Jun. 2010).
English language Abstract of KR10-2010-0042145A, (pub Apr. 2010).
English language Abstract of KR10-2018-0133141A, (pub Dec. 2018).
English language Abstract of JP2016-170942A, (pub Sep. 2016).

* cited by examiner

<COMPARATIVE EXAMPLE 1>

<EXAMPLE 1>

CATHODE ACTIVE MATERIAL, METHOD OF PREPARING THE SAME, AND LITHIUM SECONDARY BATTERY INCLUDING CATHODE INCLUDING THE SAME

TECHNICAL FIELD

The present disclosure relates to a cathode active material of a novel composition, a cathode including the cathode active material, and a lithium secondary battery including the cathode.

The present invention was performed with the financial support of the Ministry of Trade, Industry, and Energy (MOTIE) in the project identification No. P0009541 under the subject "Development of High strength, Long lifespan, and Highly Stable Ni-rich NCA (>210 mAh/g, @4.3V) Cathode Material for Medium-to-large Lithium Secondary Battery".

BACKGROUND ART

Since lithium secondary batteries were commercialized by Sony in 1991, demand for lithium secondary batteries has increased rapidly in various fields from small home appliances such as mobile information technology (IT) products to medium-to-large electric vehicles and energy storage systems. In particular, for medium-to-large electric vehicles and energy storage systems, a low-cost and high-energy cathode material is essential, but cobalt, which is a main raw material of a commercially available cathode active material, monocrystalline $LiCoO_2$ (LCO), is expensive.

Thus, in recent years, a Ni-based cathode active material, in which a part of Co is substituted with another transition metal, represented by $LiNi_xCo_yMn_zO_2$ (NCM, where x+y+z=1) and $LiNi_xCo_yAl_zO_2$ (NCA, where x+y+z=1) is used instead of LCO as a cathode active material for a medium-to-large secondary battery, and these NCM- and NCA-based cathode active materials have advantage in providing low cost and high reversible capacity as nickel is their raw material. Particularly, in terms of high capacity, NCM and NCA having about 50 mol % or more of a molar ratio of Ni have attracted attention. In general, the Ni-based cathode active material is prepared by mixing a transition metal compound precursor, which is synthesized by a co-precipitation method, with a lithium source and then synthesizing the resultant into a solid phase. However, thus synthesized Ni-based cathode material exists in the form of secondary particles in which small primary particles are agglomerated, and there is a problem that microcracks are generated in the secondary particles during a long-term charge/discharge process. Microcracks cause a side reaction between a new interface of the cathode active material and an electrolyte, which results deterioration of battery performance such as deterioration of stability due to gas generation and deterioration of battery performance due to exhaustion of the electrolyte. Also, the electrode density (>3.3 g/cc) needs to be increased to realize high energy density, which causes the collapse of secondary particles, and the electrolyte is depleted due to side reaction with the electrolyte, causing a rapid decrease in initial lifespan. After all, this implies that a high energy density of the secondary-particle Ni-based cathode active material synthesized by the conventional coprecipitation method may not be achieved.

In order to solve the above-described problems of the secondary-particle Ni-based cathode active material, studies on a single-particle Ni-based cathode active material have recently been conducted. The monocrystalline Ni-based cathode active material may provide excellent electrochemical performance since no particle collapse occurs when the electrode density is increased (>3.3 g/cc) to realize a high energy density. However, there has been a problem of deterioration of battery stability due to structural and/or thermal instability caused by unstable $Ni^{3+}$ and $Ni^{4+}$ ions in the electrochemical evaluation. Therefore, in order to develop a high energy lithium secondary battery, a technique for stabilizing unstable Ni ions in a monocrystalline Ni-based cathode active material is still needed.

DESCRIPTION OF EMBODIMENTS

Technical Problem

Provided is a cathode active material with high-energy density and improved long lifespan characteristics by stabilizing unstable Ni ions in a monocrystal Ni-based cathode active material as described above.

Solution to Problem

According to an aspect of the present disclosure, a cathode active material includes
a core including a compound represented by Formula 1; and
a coating layer including a phosphorus-containing compound disposed on a surface of the core:

$$Li_aZr_\alpha W_\beta M_{1-\alpha-\beta}O_{2-b}S_b \qquad \text{Formula 1}$$

wherein, in Formula 1,
M is at least one transition metal selected from transition metals, except Zr and W; and
$0.98 \leq a \leq 1.02$, $0 < \alpha \leq 0.005$, $0 < \beta \leq 0.005$, and $0 < b \leq 0.1$.

According to another aspect of the present disclosure, a method of preparing a cathode active material includes
mixing a lithium precursor, a Zr precursor, a W precursor, a M precursor, a S precursor, and a phosphorus-containing compound precursor to prepare a precursor mixture; and
heat-treating the precursor mixture to prepare a cathode active material represented by Formula 1.

According to another aspect of the present disclosure, a lithium secondary battery includes
a cathode including the cathode active material;
an anode; and
an electrolyte.

Advantageous Effects of Disclosure

According to an aspect of an embodiment, a cathode active material includes a core and a coating layer, wherein a part of a transition metal of a compound in the core is substituted with W and Zr, and a part of oxygen is substituted with S element, which stabilizes unstable Ni cations in the cathode active material; and the coating layer including a phosphorus-containing compound on the surface of the core suppresses a side reaction with an electrolyte and decreases residual lithium. Thus, a lithium secondary battery including the cathode active material may have stability and long-lifespan characteristics.

MODE OF DISCLOSURE

Figure 1:
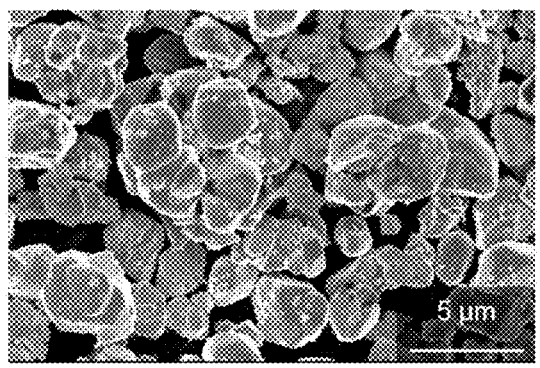
FIG. 1 is a scanning electron microscope (SEM) image of cathode active materials of Example 1 and Comparative Example 1.
Figure 1:
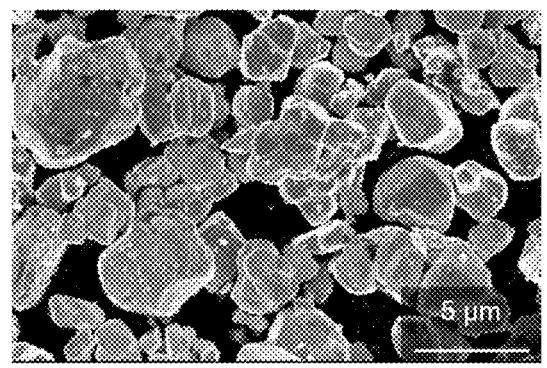

Hereinafter, as the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "including," "having," and "comprising" are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context.

In the drawings, the thicknesses of layers and regions are exaggerated or reduced for clarity. Like reference numerals in the drawings denote like elements. Throughout the specification, it will be understood that when a component, such as a layer, a film, a region, or a plate, is referred to as being "on" another component, the component may be directly on the other component or intervening components may be present thereon. Throughout the specification, while such terms as "first," "second," etc., may be used to describe various components, such components must not be limited to the above terms. The above terms are used only to distinguish one component from another.

Hereinafter, according to one or more embodiments, a cathode active material, a method of preparing the cathode active material, and a lithium secondary battery including a cathode including the cathode active material will be described in detail.

According to an embodiment, a cathode active material includes a core including a compound represented by Formula 1; and a coating layer including a phosphorus-containing compound disposed on a surface of the core.

$$Li_a Zr_\alpha W_\beta M_{1-\alpha-\beta} O_{2-b} S_b \quad \text{Formula 1}$$

In Formula 1,

M is at least one transition metal selected from transition metals, except Zr and W; and $0.98 \leq a \leq 1.02$, $0 < \alpha \leq 0.005$, $0 < \beta \leq 0.005$, and $0 < b \leq 0.1$.

The compound represented by Formula 1 in the cathode active material has a part of the transition metal substituted with Zr and W and a part of oxygen substituted with S. In this regard, unstable Ni ions, e.g., $Ni^{3+}$ or $Ni^{4+}$, in the cathode active material are reduced to the stable form, $Ni^{2+}$, and thus lifespan characteristics of the cathode active material may improve.

Also, the phosphorus-containing compound included in the coating layer is a product produced by a reaction between residual lithium such as $Li_2CO_3$ or LiOH existing on the surface of the core and a phosphorus precursor compound. The residual lithium is produced by a reaction of lithium with carbon dioxide and moisture in the air in the spontaneous reduction process of unstable $Ni^{3+}$ to $Ni^{2+}$. In addition, stability problems may occur due to generation of $CO_2$ gas by the electrochemical decomposition of residual lithium during charging or generation of gas caused by a side reaction with an electrolyte. When an amount of the residual lithium of the cathode active material may significantly decrease by the formation of the coating layer, the cathode active material may have a high-energy density and improved lifespan characteristics.

In one embodiment, M may include at least one transition metal selected from Ni, Co, Mn, Al, Mg, V, and Ti.

In one embodiment, M may include at least one transition metal selected from Ni, Co, Mn, Al, Mg, and V. For example, M may include at least one transition metal selected from Ni, Co, Mn, Al, and Mg. For example, M may include at least one transition metal selected from Ni, Co, Mn, and Al.

In one embodiment, M includes Ni, and a molar ratio of Ni atom in M may be higher than about 60 mol %. For example, a molar ratio of Ni atom in M may be about 65 mol % or higher, about 66 mol % or higher, about 67 mol % or higher, about 68 mol % or higher, about 69 mol % or higher, about 70 mol % or higher, about 71 mol % or higher, about 73 mol % or higher, about 74 mol % or higher, about 75 mol % or higher, about 76 mol % or higher, about 77 mol % or higher, about 78 mol % or higher, or about 79 mol % or higher.

In one embodiment, in Formula 1, $0 < b \leq 0.09$, $0 < b \leq 0.08$, $0 < b \leq 0.07$, $0 < b \leq 0.06$, $0 < b \leq 0.05$, $0 < b \leq 0.04$, $0 < b \leq 0.03$, $0 < b \leq 0.02$, or $0 < b \leq 0.01$.

In one embodiment, Formula 1 may be represented by any one of Formulae 2-1 to 2-3.

$$Li_{a'} Zr_{\alpha'} W_{\beta'} Ni_{1-x'-y'-\alpha'-\beta'} Co_{x'} Mn_{y'} O_{2-b'} S_{b'} \quad \text{Formula 2-1}$$

$$Li_{a''} Zr_{\alpha''} W_{\beta''} Ni_{1-x''-y''-\alpha''-\beta''} Co_{x''} Al_{y''} O_{2-b''} S_{b''} \quad \text{Formula 2-2}$$

$$Li_{a'''} Zr_{\alpha'''} W_{\beta'''} Ni_{1-x'''-\alpha'''-\beta'''} Co_{x'''} O_{2-b'''} S_{b'''} \quad \text{Formula 2-3}$$

In Formula 2-1, $0.98 < a' \leq 1.02$, $0 < \alpha' 0.005$, $0 < \beta' \leq 0.005$, $0 < x' \leq 0.2$, $0 < y' \leq 0.3$, and $0 < b' \leq 0.1$.

In Formula 2-2,
0.98<a"≤1.02, 0<α"≤0.005, 0<β"≤0.005, 0<x"≤0.2, 0<y"≤0.05, and 0<b"≤00.1.

In Formula 2-3,
0.98<a'''≤1.02, 0<α'''≤0.005, 0<β'''≤0.005, 0<x'''≤0.2, and 0<b'''≤0.1.

For example, in Formula 2-1, 0.05≤x'0.2, 0<x'≤0.15, or 0.05≤x'≤0.15.

For example, in Formula 2-1, 0<y'≤0.2 or 0<y'≤0.1.

For example, in Formula 2-2, 0.05≤x"≤0.2, 0<x"≤0.15, or 0.05≤x"≤0.15.

For example, in Formula 2-2, 0≤y"≤0.2 or 0<y"≤0.1.

For example, in Formula 2-3, 0.05≤x'''≤0.2, 0<x'''0.15, or 0.05≤x'''≤0.15.

In one embodiment, the phosphorus-containing compound may be crystalline, amorphous, or a combination thereof.

Examples of the phosphorus-containing compound may be a phosphorus-containing compound including crystalline $Li_3PO_4$ or an amorphous phosphorus-containing compound including lithium, phosphorus, and oxygen atoms.

In one embodiment, a molar ratio of phosphorus (P) element in the cathode active material may be about 0.2 mol % or lower of the total elements included in the cathode active material.

In one embodiment, the phosphorus-containing compound may include a compound represented by Formula 3:

   Formula 3

In Formula 3, 0<a≤3, 0<b≤1, and 0<c≤4.

In one embodiment, the coating layer may have a continuous coating layer on a surface of the core or a coating layer in the form of an island type partially existing on a surface of the core. For example, the coating layer may have a coating layer in the form of an island type on a surface of the core.

In one embodiment, the cathode active material may have a peak at an angle 2θ in a range of about 20° to about 25° in the XRD spectrum obtained by using an XRD analysis using a CuKα ray.

In the XRD graph, the peak at an angle 2θ in a range of about 20° to about 25° denotes the existence of $Li_3PO_4$. Also, although it will be described later, the peak is observed in the coating layer of the cathode active material, and thus P element does not exist in the core of the cathode active material.

In one embodiment, the cathode active material may be a monocrystal. Here a concept of a monocrystal is different from that of a single particle. A single particle denotes a particle that is formed as one particle regardless of a type and a number of crystals in a material, and a monocrystal denotes that a single crystal is included a particle. When the core has a monocrystal, structural stability may be high. Also, lithium ion conduction of a monocrystal may be higher than that of a polycrystal, and thus an active material of a monocrystal may have better high-speed charging characteristics than those of an active material of a polycrystal.

In one embodiment, the cathode active material may be a single particle. Here, the term "single particle" is a concept different from a secondary particle, which is an aggregate of a plurality of single particles. When the cathode active material is in the form of a single particle, breakage of the particle at a high electrode density may be prevented. Thus, the cathode active material may have a high energy density. Since the core is a single particle, the breakage during roll-pressing is prevented, which allows the core to have a high energy density, and lifespan deterioration according to the breakage of the particle may be prevented.

In one embodiment, the cathode active material is a monocrystal and a single particle. When the cathode active material is formed of a monocrystal and a single particle, an electrode may be structurally stable and may have a high density, and thus a lithium secondary battery including the electrode may have improved lifespan characteristics and a high energy density at the same time.

In one embodiment, an average particle diameter ($D_{50}$) of the cathode active material may be in a range of about 0.1 μm to about 20 μm. For example, an average particle diameter ($D_{50}$) of the cathode active material may be in a range of about 0.1 μm to about 15 μm, about 0.1 μm to about 10 μm, about 1 μm to about 20 μm, about 5 μm to about 20 μm, about 1 μm to about 15 μm, about 1 μm to about 10 μm, about 5 μm to about 15 μm, or about 5 μm to about 10 μm. When the average particle diameter of the cathode active material is within these ranges, a cathode comprising the cathode active material may have the desired energy density per volume. When the average particle diameter of the cathode active material is greater than about 20 μm, a charge/discharge capacity may drastically decrease, and when equal to or less than about 0.1 μm, the desired energy density per volume may not be obtained.

Hereinafter, a method of preparing the cathode active material according to an embodiment will be described in detail.

According to another embodiment, a method of preparing a cathode active material includes mixing a lithium precursor, a Zr precursor, a W precursor, a S precursor, and a phosphorus-containing compound precursor to prepare a precursor mixture; and heat-treating the precursor mixture to obtain a cathode active material represented by Formula 1:

   Formula 1

In Formula 1,
M is at least transition metal selected from transition metals, except Zr and W; and
0.98≤a≤1.02, 0<α≤0.005, 0<β≤0.005, and 0<b≤0.1.

Formula 1 is the same as defined in the description above.

The mixing of the precursors may include mechanical mixing of the precursors. The mechanical mixing may be performed in a dry manner. The mechanical mixing pulverizes and mixes materials to be mixed by applying a mechanical force to form a homogenous mixture. The mechanical mixing may be performed by a mixing device such as a ball mill using chemically inert beads, a planetary mill, a stirred ball mill, and a vibrating mill. Here, alcohol such as ethanol and high fatty acid such as stearic acid may be optionally added at a small amount in order to enhance maximize a mixing effect.

The mechanical mixing is performed in an oxidizing atmosphere, and this is for structural stability of an active material by preventing reduction of a transition metal from a transition metal source (e.g., a Ni compound).

Example of the lithium precursor may include a lithium hydroxide, a lithium oxide, a lithium nitride, a lithium carbonate, or a combination thereof, but embodiments are not limited thereto. For example, the lithium precursor may be LiOH or $Li_2CO_3$.

Example of the Zr precursor may include a hydroxide, an oxide, a nitride or a carbonate of Zr, or a combination thereof, but embodiments are not limited thereto. For example, the Zr precursor may be $Zr(OH)_4$, $ZrO_2$, or a combination thereof.

Example of the W precursor may include a hydroxide, an oxide, a nitride or a carbonate of W, or a combination thereof, but embodiments are not limited thereto. For example, the W precursor may be $W(OH)_6$, $WO_3$, or a combination thereof.

Example of the M precursor may include a hydroxide, an oxide, a nitride or a carbonate of at least one transition metal selected from Ni, Mn, Co, or a combination thereof, but embodiments are not limited thereto.

Examples of the phosphorus-containing compound precursor include all phosphorus-containing compounds that may provide P element. For example, the phosphorus-containing compound precursor may be $(NH_4)_2HPO_4$.

Examples of the S precursor may include a hydroxide, an oxide, a nitride, a carbonate, an ammonium, or a combination thereof of S, but embodiments are not limited thereof. The S precursor may be $SO_2$ or $(NH_4)_2S$.

The method may include heat-treating of the precursors after the mixing of the precursors. The heat-treating of the precursors may include first heat-treating and second heat-treating. The first heat-treating and the second heat-treating may be continuously performed, or the method may include a resting period after the first heat-treating. Also, the first heat-treating and the second heat-treating may be performed in the same chamber or in different chambers.

A heat-treating temperature of the first heat-treating may be higher than a heat-treating temperature of the second heat-treating.

The first heat-treating may be performed at a heat-treating temperature in a range of about 800° C. to about 1200° C. The heat-treating temperature may be, for example, in a range of about 850° C. to about 1200° C., about 860° C. to about 1200° C., about 870° C. to about 1200° C., about 880° C. to about 1200° C., about 890° C. to about 1200° C., or about 900° C. to about 1200° C., but embodiments are not limited thereto, and examples of the heat-treating temperature may include any range of two arbitrary points selected within these ranges.

A heat-treating temperature of the second heat-treating may be in a range of about 700° C. to about 800° C. The heat-treating temperature may be, for example, in a range of about 710° C. to about 800° C., about 720° C. to about 800° C., about 730° C. to about 800° C., about 740° C. to about 800° C., about 750° C. to about 800° C., about 700° C. to about 780° C., about 700° C. to about 760° C., about 700° C. to about 750° C., or about 700° C. to about 730° C., but embodiments are not limited thereto, and examples of the heat-treating temperature may include any range of two arbitrary points selected within these ranges.

In one embodiment, a heat-treating time of the first heat-treating may be shorter than a heat-treating time of the second heat-treating.

For example, the heat-treating time of the first heat-treating may be in a range of about 3 hours to about 5 hours, about 4 hours to about 5 hours, or about 3 hours to about 4 hours, but embodiments are not limited thereto, and examples of the heat-treating time may include any range of two arbitrary points selected within these ranges.

For example, a heat-treating time of the second heat-treating may be in a range of about 10 hours to about 20 hours or about 10 hours to about 15 hours, but embodiments are not limited thereto, and examples of the heat-treating time may include any range of two arbitrary points selected within these ranges.

The first heat-treating may include heat-treating at a heat-treating temperature in a range of about 800° C. to about 1200° C. for about 3 hours to about 5 hours.

The second heat-treating may include heat-treating at a heat-treating temperature in a range of about 700° C. to about 800° C. for about 10 hours to about 20 hours.

The first heat-treating causes a lithium transition metal oxide to form a cathode active material of a layered structure and generate growth of particles at the same time, and thus a shape of a monocrystal may be formed. In the first heat-treating, it is deemed that each of primary particles in the lithium transition metal oxide in a secondary particle shape rapidly grows, the primary particles fuse to each other as the inside of the primary particles are exposed and not withstand the stress between the particles, and thus a monocrystal cathode active material for a secondary battery is formed. When the second heat-treating is performed for a long time at a temperature lower than that of the first heat-treating, a crystallinity of the layered structure produced in the first heat-treating may increase. Through the first and second heat-treating, a nickel-based cathode active material of a single phase, monocrystal, and single particle may be obtained.

In one embodiment, the lithium transition metal oxide prepared by using the preparation method may have a layered structure of a monocrystal and a single particle, and the monocrystal may have a layered structure. Also, an average particle diameter of the lithium transition metal oxide may be in a range of about 0.1 μm to about 20 μm.

Also, in the cathode active material prepared by using the method of preparing a cathode active material, W and Zr elements substitute transition metal sites, and S element substitutes O sites in the structure. When W, Zr, and S elements are substituted in the structure of the Ni-based cathode active material, reduction from the former existing $Ni^{3+}$ ions to $Ni^{2+}$ ions may occur. Since the radii of the reduced $Ni^{2+}$ ions and $Li^+$ ions are similar, Li/Ni disordering may be promoted, and thus an oxygen lattice structure in the core may be partially changed. When the oxygen lattice structure is partially changed, the P element occupies tetrahedral sites in the structure, and thus a $PO_4$ may not be formed. Thus, the P element may not penetrate into the tetrahedral position in the core and may exist in the form of the phosphorus-containing compound, e.g., $Li_3PO_4$ on a surface of the cathode active material.

Also, when the cathode active material prepared by using the method includes a core including a transition metal oxide, in which a part of the transition metal is substituted with Zr and W, and a part of oxygen (O) is substituted with S; and a coating layer including a phosphorus-containing compound on a surface of the core, a cathode active material having an amount of residual lithium and an amount of unstable Ni ions decrease at the same time may be obtained, and a lithium secondary battery including the cathode active material may have a high energy density and long lifespan.

According to another embodiment, provided is a cathode including the cathode active material.

According to another embodiment, provided is a lithium secondary battery including the cathode; an anode; and an electrolyte.

The cathode and the lithium secondary battery including the same may be prepared in the following manner.

First, a cathode is prepared.

For example, the cathode active material, a conducting agent, a binder, and a solvent are mixed to prepare a cathode active material composition. The cathode active material composition is directly coated on a metallic current collector to prepare a cathode plate. In some embodiments, the cathode active material composition may be cast on a separate support to form a cathode active material film, which may then be separated from the support and laminated on a metallic current collector to prepare a cathode plate. The cathode is not limited to the examples described above, and may be one of a variety of types.

Examples of the conducting agent may be graphite such as natural graphite or artificial graphite; carbon black; conductive tubes such as carbon nanotubes; fluorocarbon; conductive whiskers such as zinc oxide and potassium titanate; and conductive metal oxides such as titanium oxide, but embodiments are not limited thereto, and any material available as a conducting agent in the art may be used.

Examples of the binder may be a vinylidene fluoride/hexafluoropropylene copolymer, polyvinylidene fluoride (PVDF), polyacrylonitrile, polymethylmethacrylate, polytetrafluoroethylene, mixtures or metal salts thereof, and a styrene butadiene rubber polymer, but embodiments are not limited thereto, and any material available as a binder in the art may be used. In some embodiments, examples of the binder may be a lithium salt, a sodium salt, a calcium salt, or a Na salt of these polymers.

Examples of the solvent may be N-methyl-pyrrolidone, acetone, or water, but embodiments are not limited thereto, and any material available as a solvent in the art may be used.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, an anode is prepared.

For example, an anode active material, a conducting agent, a binder, and a solvent are mixed to prepare an anode active material composition. In some embodiments, the anode active material composition may be directly coated on a metallic current collector having a thickness in a range of about 3 μm to about 500 μm and dried to prepare an anode plate. In some embodiments, the anode active material composition may be cast on a separate support to form an anode active material film, which may then be separated from the support and laminated on a metallic current collector to prepare an anode plate.

Examples of a material for the anode current collector are not particularly limited as long as they do not cause a chemical change to a battery. Examples of the material for the anode current collector may be copper, nickel, and copper that is surface-treated with carbon.

In some embodiments, the anode active material may be any material available as an anode active material for a lithium battery in the art. For example, the anode active material may include at least one selected from the group consisting of lithium metal, a metal alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, and Y is not Si), and a Sn—Y alloy (where Y is an alkali metal, an alkali earth metal, a Group XIII element, a Group XIV element, a transition metal, a rare earth element, or a combination thereof, and Y is not Sn). In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), or tellurium (Te).

Examples of the transition metal oxide include a lithium titanium oxide, a vanadium oxide, and a lithium vanadium oxide.

Examples of the non-transition metal oxide include $SnO_2$ and $SiO_x$ (where $0<x<2$).

Examples of the carbonaceous material may be crystalline carbon, amorphous carbon, and mixtures thereof. Examples of the crystalline carbon may be graphite, such as natural graphite or artificial graphite that are in shapeless, plate, flake, spherical, or fibrous form. Examples of the amorphous carbon may be soft carbon (carbon sintered at low temperatures), hard carbon, meso-phase pitch carbides, and sintered cokes.

In some embodiments, the conducting agent, the binder, and the solvent used for the anode active material composition may be the same as those used for the cathode active material composition.

The amounts of the anode active material, the conducting agent, the binder, and the solvent may be the same levels generally used in the art for lithium batteries. At least one of the conducting agent, the binder, and the solvent may be omitted according to the use and the structure of the lithium battery.

Next, a separator to be inserted between the cathode and the anode is prepared.

The separator for the lithium battery may be any separator that is commonly used in lithium batteries. In some embodiments, the separator may have low resistance to migration of ions in an electrolyte and have an excellent electrolyte-retaining ability. The separator may be a single layer or multiple layers. For example, the separator may be formed of glass fibers, polyester, Teflon, polyethylene, polypropylene, polytetrafluoroethylene (PTFE), or a combination thereof, which may have a non-woven form or a woven form. The separator may have a mixed multi-layer structure such as a two-layer separator of polyethylene/polypropylene, a three-layer separator of polyethylene/polypropylene/polyethylene, and a three-layer separator of polyprolyene/polyethylene/polypropylene. For example, a rollable separator such as polyethylene or polypropylene may be used for a lithium ion battery, and a separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any material that is used as a binder for electrode plates. Examples of the polymer resin may be a vinylidenefluoride/hexafluoropropylene copolymer, polyvinylidene fluoride (PVDF), polyacrylonitrile, polymethylmethacrylate, and a mixture thereof.

Next, an electrolyte is prepared.

For example, the electrolyte may be an organic electrolyte solution. In some embodiments, the electrolyte may be in a solid phase. Examples of the electrolyte may be boron oxide and lithium oxynitride, but embodiments are not limited thereto, and any material available as a solid electrolyte in the art may be used. In some embodiments, the solid electrolyte may be formed on the anode by, for example, sputtering.

For example, the organic electrolyte solution may be prepared by dissolving a lithium salt in an organic solvent.

The organic solvent may be any solvent available as an organic solvent in the art. In some embodiments, examples of the organic solvent may be cyclic carbonates such as propylene carbonate, ethylene carbonate, fluoroethylene carbonate, butylene carbonate, and vinylene carbonate; chain carbonates such as dimethyl carbonate, diethyl carbonate, methylethyl carbonate, methylpropyl carbonate, ethylpropyl carbonate, methylisopropyl carbonate, dipropyl carbonate, and dibutyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; and amides such as dimethylformamide. These examples of the organic solvent may be used alone or as a mixture of at least two selected therefrom. For example, a solvent prepared by mixing a cyclic carbonate and a chain carbonate.

In some embodiments, the electrolyte may be a gel-phase polymer electrolyte prepared by impregnating a polymer electrolyte such as polyethylene oxide or polyacrylonitrile with an electrolyte solution or may be an inorganic solid electrolyte such as LiI, Li$_3$N, Li$_x$Ge$_y$P$_z$S$_\alpha$, or Li$_x$Ge$_y$P$_z$S$_\alpha$X$_\delta$ (where X is F, Cl, or Br).

In some embodiments, the lithium salt may be any material available as a lithium salt in the art. In some embodiments, the lithium salt may be LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (where x and y are each independently a natural number), LiCl, LiI, or a mixture thereof.

Figure 12:
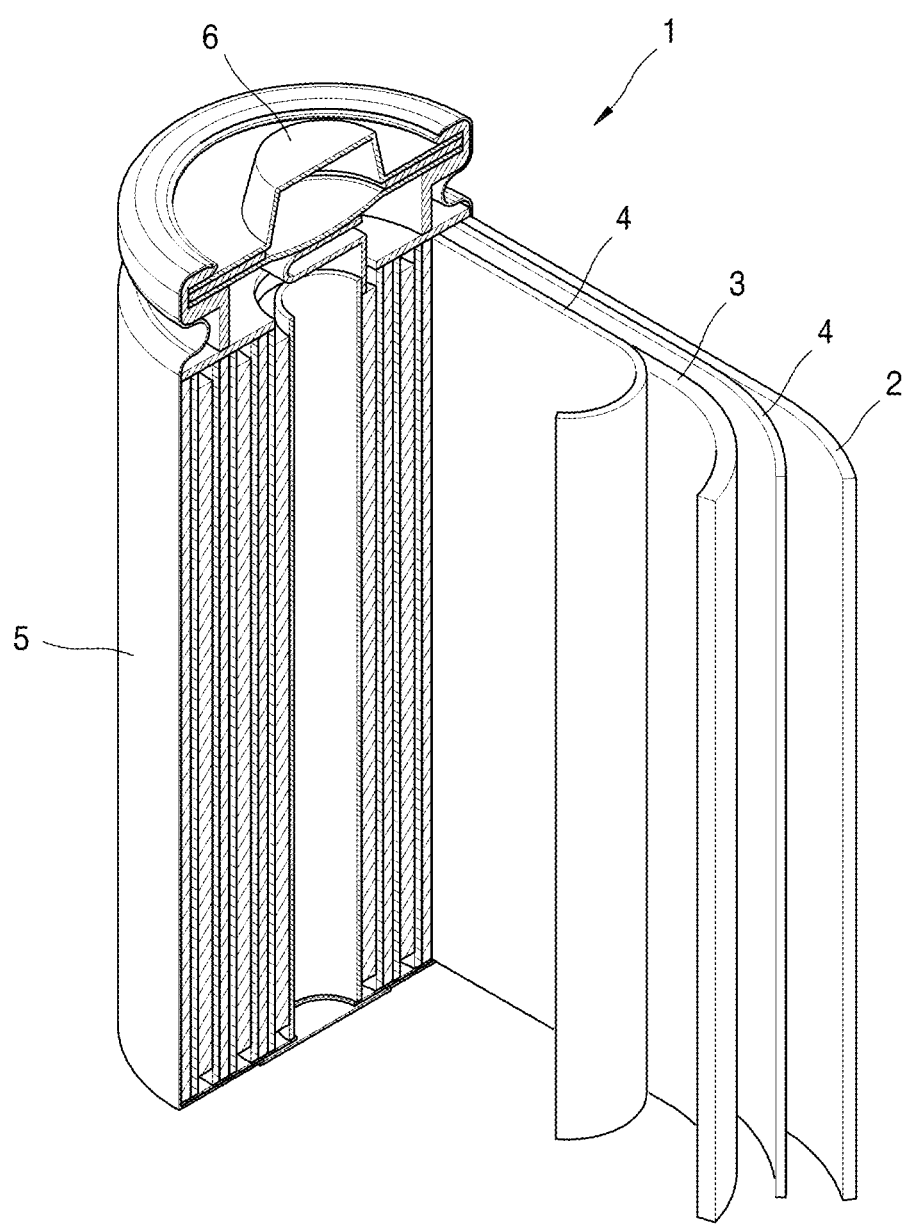
FIG. 12 is a schematic view of a lithium battery according to an embodiment.

As shown in FIG. 12, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, a pouch type, a coin type, or a thin-film type. For example, the lithium battery 1 may be a thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolytic solution, and the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery may have improved lifespan characteristics and high-rate characteristics, and thus may be used in an electric vehicle (EV), for example, in a hybrid vehicle such as a plug-in hybrid electric vehicle (PHEV). Also, the lithium battery may be applicable to the high-power storage field. For example, the lithium battery may be used in an electric bicycle, a power tool, or a system for storing electric power.

One or more embodiments will now be described in more detail with reference to the following examples. However, these examples are not intended to limit the scope of the one or more embodiments.

(Preparation of Cathode Active Material)

Example 1

100 g of Ni$_{0.8}$Co$_{0.1}$Mn$_{0.1}$(OH)$_2$, 41.8 g of Li$_2$CO$_3$, 0.9 g of Zr(OH)$_4$, 1.5 g of WO$_3$, 0.07 g of SO$_2$, and 0.30 g of (NH$_4$)$_2$HPO$_4$ were mechanically mixed for about 15 minutes to prepare a powder mixture. The powder mixture was calcined at 1,000° C. for 4 hours and at 700° C. for 10 hours to synthesize a cathode active material having a composition shown in Table 1.

Example 2

100 g of Ni$_{0.80}$Co$_{0.15}$Al$_{0.05}$(OH)$_2$, 42.2 g of Li$_2$CO$_3$, 0.9 g of Zr(OH)$_4$, 1.5 g of WO$_3$, 0.07 g of SO$_2$, 0.30 g of (NH$_4$)$_2$HPO$_4$ were mechanically mixed for about 15 minutes to prepare a powder mixture. The powder mixture was calcined at 950° C. for 4 hours and at 700° C. for 10 hours to synthesize a cathode active material having a composition shown in Table 1.

Example 3

100 g of Ni$_{0.9}$Co$_{0.1}$(OH)$_2$, 42.0 g of Li$_2$CO$_3$, 0.9 g of Zr(OH)$_4$, 1.5 g of WO$_3$, 0.07 g of SO$_2$, and 0.30 g of (NH$_4$)$_2$HPO$_4$ were mechanically mixed for about 15 minutes to prepare a powder mixture. The powder mixture was calcined at 920° C. for 4 hours and at 700° C. for 10 hours to synthesize a cathode active material having a composition shown in Table 1.

Comparative Example 1

100 g of Ni$_{0.8}$Co$_{0.1}$Mn$_{0.1}$(OH)$_2$ and 41.8 g of Li$_2$CO$_3$ were mechanically mixed for about 15 minutes to prepare a powder mixture. The powder mixture was calcined at 1,000° C. for 4 hours and at 700° C. for 10 hours to synthesize a cathode active material having a composition shown in Table 1.

Comparative Example 2

100 g of Ni$_{0.8}$Co$_{0.1}$Mn$_{0.1}$(OH)$_2$, 41.8 g of Li$_2$CO$_3$, 0.9 g of Zr(OH)$_4$, 1.5 g of WO$_3$, and 0.07 g of SO$_2$ were mechanically mixed for about 15 minutes to prepare a powder mixture. The powder mixture was calcined at 950° C. for 4 hours and at 700° C. for 10 hours to synthesize a cathode active material having a composition shown in Table 1.

Comparative Example 3

100 g of Ni$_{0.8}$Co$_{0.1}$Mn$_{0.1}$(OH)$_2$, 41.8 g of Li$_2$CO$_3$, 0.9 g of Zr(OH)$_4$, 1.5 g of WO$_3$, and 0.30 g of (NH$_4$)$_2$HPO$_4$ were mechanically mixed for about 15 minutes to prepare a powder mixture. The powder mixture was calcined at 950°

C. for 4 hours and at 700° C. for 10 hours to synthesize a cathode active material having a composition shown in Table 1.

Comparative Example 4

100 g of $Ni_{0.8}Co_{0.1}Mn_{0.1}(OH)_2$, 41.8 g of $Li_2CO_3$, 0.9 g of $Zr(OH)_4$, 1.5 g of $WO_3$, and 0.10 g of $NH_4HF_2$ were mechanically mixed for about 15 minutes to prepare a powder mixture. The powder mixture was calcined at 950° C. for 4 hours and at 700° C. for 10 hours to synthesize a cathode active material having a composition shown in Table 1.

Comparative Example 5

100 g of $Ni_{0.80}Co_{0.15}Al_{0.05}(OH)_2$ and 42.2 g of $Li_2CO_3$ were mechanically mixed for about 15 minutes to prepare a powder mixture. The powder mixture was calcined at 950° C. for 4 hours and at 700° C. for 10 hours to synthesize a cathode active material having a composition shown in Table 1.

Comparative Example 6

100 g of $Ni_{0.9}Co_{0.01}(OH)_2$ and 42.0 g of $Li_2CO_3$ were mechanically mixed for about 15 minutes to prepare a powder mixture The powder mixture was calcined at 920° C. for 4 hours and at 700° C. for 10 hours to synthesize a cathode active material having a composition shown in Table 1

(Preparation of Half-Cell)

Example 4

The cathode active material prepared in Example 1, a conducting agent, and a binder were mixed at a weight ratio of 94:3:3 to prepare a slurry. Here, carbon black was used as the conducting agent, polyvinylidene fluoride (PVdF) was dissolved in an N-methyl-2-pyrrolidone solvent and used as the binder.

The slurry was evenly coated on an Al current collector and dried at 110° C. for 2 hours to prepare a cathode. A loading level of the cathode was about 11.0 mg/cm², and an electrode density of the cathode was 3.6 g/cc.

The cathode was used as a working electrode, lithium foil was used as a counter electrode, $LiPF_6$ was added to a concentration of 1.3 M in a solvent mixture prepared by mixing ethylene carbonate (EC), ethylmethyl carbonate (EMC), and diethyl carbonate (DEC) at a volume ratio of 3:4:3 to prepare a liquid electrolyte, and thus CR2032 half-cells were prepared according to a commonly known process using the working electrode, the counter electrode, and the liquid electrolyte.

Examples 5 and 6

Half-cells were prepared in the same manner as in Example 4, except that the cathode active materials prepared in Examples 2 and 3 were each respectively used instead of the cathode active material prepared in Example 1.

Comparative Examples 7 to 12

Half-cells were prepared in the same manner as in Example 4, except that the cathode active materials prepared in Comparative Examples 1 to 6 were each respectively used instead of the cathode active material prepared in Example 1.

Evaluation Example 1: Room-Temperature Lifespan Evaluation

After resting the half-cells prepared in Examples 4 to 6 and Comparative Examples 7 to 12 for 10 hours, the half-cells were charged at 0.1 C until 4.3 V with a constant current (CC) mode, and then the half-cells were charged until a current corresponding to 0.05 C with a constant voltage (CV) mode. Next, the half-cells were discharged at 0.1 C until 3.0 V with a CC mode to complete a formation process.

Subsequently, the half-cells were charged at 0.1 C until 3.0 V with a CC mode at room temperature (25° C.) at 0.5 C until 4.3 V with a CC mode, and then the half-cells were charged until a current corresponding to 0.05 C with a CV mode. Next, the half-cells were discharged at 1 C until 3.0 V with a CC mode, and this charging/discharging process was repeated 50 times.

Capacity retention rates of the half-cells after 50 times of charging/discharging cycles with respect to the initial capacity were calculated, and the results are shown in Table 1. Also, graphs representing the capacity retention rates according to cycles are shown in FIGS. 6 to 11.

TABLE 1

| Cathode active material/half-cell | Cathode active material composition | Lifespan retention rate after 50 cycles (%) |
|---|---|---|
| Comparative Example 1/Comparative Example 7 | $LiNi_{0.8}CO_{0.1}Mn_{0.1}O_2$ | 80.1 |
| Comparative Example 2/Comparative Example 8 | $LiNi_{0.794}Co_{0.103}Mn_{0.093}W_{0.005}Zr_{0.005}O_{1.99}S_{0.01}$ | 88.3 |
| Comparative Example 3/Comparative Example 9 | $Li_xPO_y$-$LiNi_{0.794}Co_{0.103}Mn_{0.093}W_{0.005}Zr_{0.005}O_2$ | 90.2 |
| Comparative Example 4/Comparative Example 10 | $LiNi_{0.792}Co_{0.102}Mn_{0.096}W_{0.005}Zr_{0.005}O_{1.99}F_{0.01}$ | 91.0 |
| Comparative Example 5/Comparative Example 11 | $LiNi_{0.80}Co_{0.15}Al_{0.05}O_2$ | 80.6 |
| Comparative Example 6/Comparative Example 12 | $LiNi_{0.9}Co_{0.1}O_2$ | 70.6 |
| Example 1/Example 4 | $Li_xPO_y$-$LiNi_{0.794}Co_{0.103}Mn_{0.093}W_{0.005}Zr_{0.005}O_{1.99}S_{0.01}$ | 92.0 |

TABLE 1-continued

| Cathode active material/half-cell | Cathode active material composition | Lifespan retention rate after 50 cycles (%) |
|---|---|---|
| Example 2/Example 5 | $Li_xPO_y$-$LiNi_{0.795}Co_{0.1495}Al_{0.05}W_{0.005}Zr_{0.005}O_{1.99}S_{0.01}$ | 89.9 |
| Example 3/Example 6 | $Li_xPO_y$-$LiNi_{0.893}Co_{0.097}W_{0.005}Zr_{0.005}O_{1.99}S_{0.01}$ | 81.1 |

Figure 6:
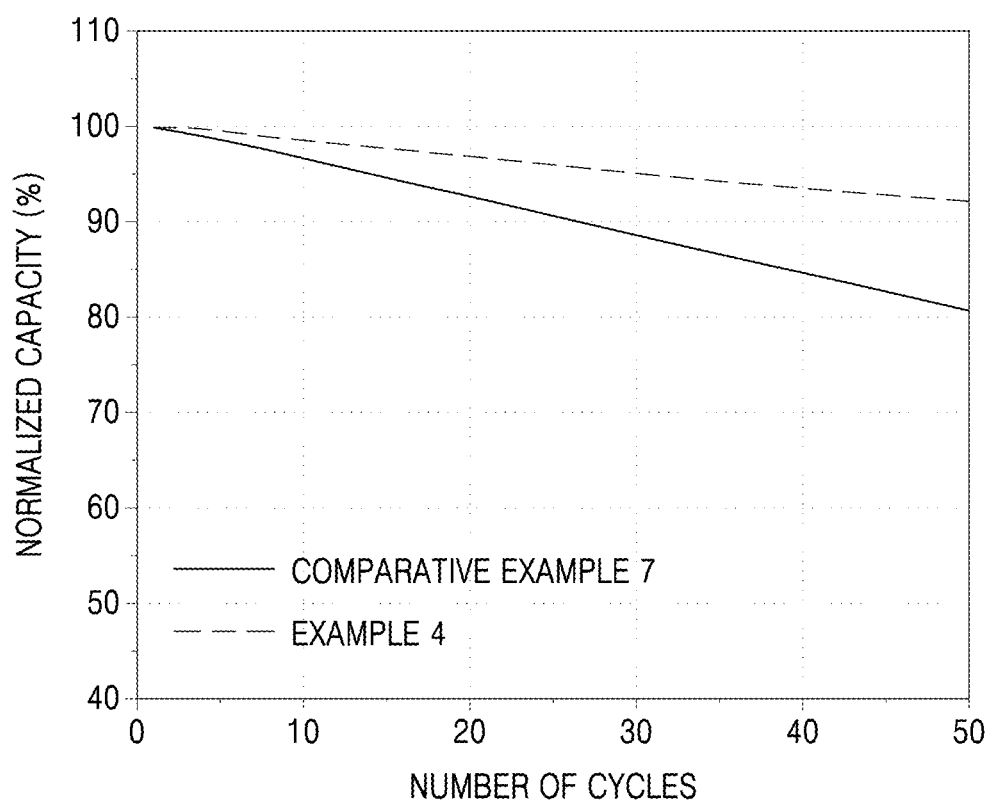
FIG. 6 is a lifespan retention rate graph of half-cells prepared in Example 4 and Comparative Example 7.

Referring to Table 1 and FIG. 6, the half-cell of Example 4 had a lifespan retention rate that is about 12% higher than that of Comparative Example 7 after the 50 cycles. It is deemed that introduction of Zr and W elements in to the structure increases ordering of Ni ions in the structure, which improves structural stability, and the S ions in the structure increase the bonding strength between a transition metal and oxygen, which suppresses a side reaction with the electrolyte by suppressing oxygen release in the structure, and thus the stability and lifespan characteristics of the half-cell may improve. Also, $Li_3PO_4$ on the surface of the core of the cathode active material preferentially reacts with HF of strong acid produced by decomposition of the binder and electrolyte salt and also reacts with moisture in the electrolyte, which suppresses deterioration of the cathode active material by the reaction of the cathode active material and HF or the side reaction with the electrolyte, and thus it is deemed that the half-cell has a long lifespan.

Figure 7:
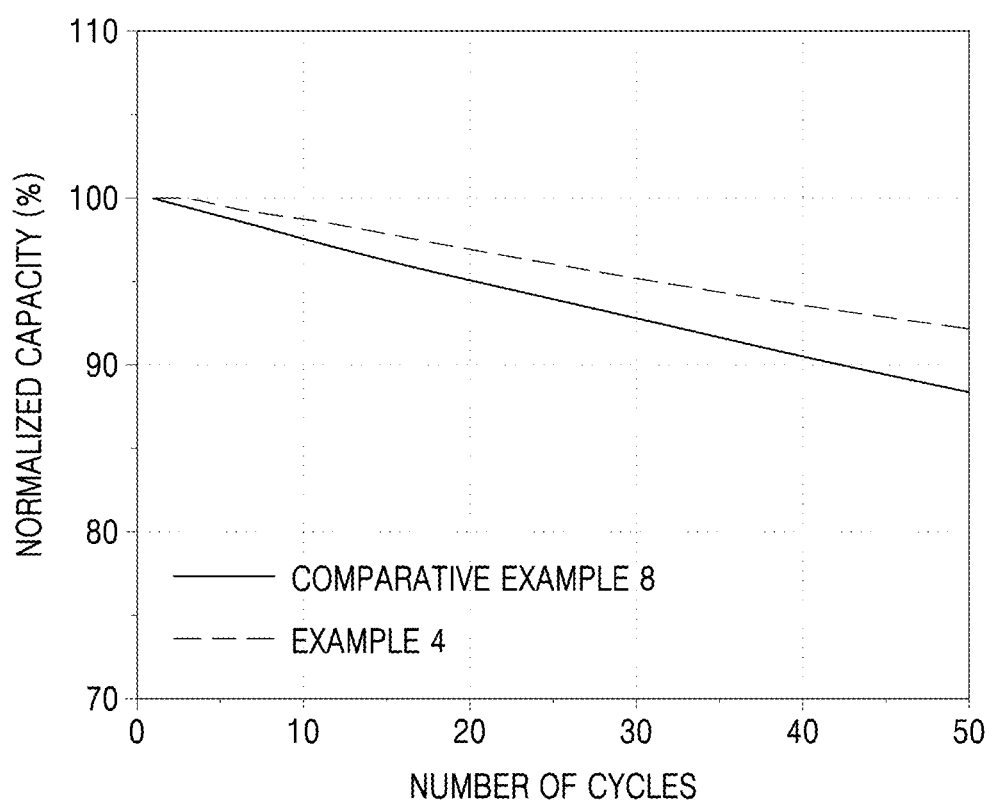
FIG. 7 is a lifespan retention rate graph of half-cells prepared in Example 4 and Comparative Example 8.

Referring to Table 1 and FIG. 7, the $Li_3PO_4$ coating layer on the surface of the single-particle-type Ni-based cathode active material has a high ion conductivity, which may increase a speed of lithium ion migration and may suppress the side reaction with the electrolyte. Thus, as a result of the room-temperature lifespan evaluation, it is deemed that the half-cell of Example 4 has about 4% lifespan retention rate after 50 cycles improved compared to that of Comparative Example 8.

Figure 8:
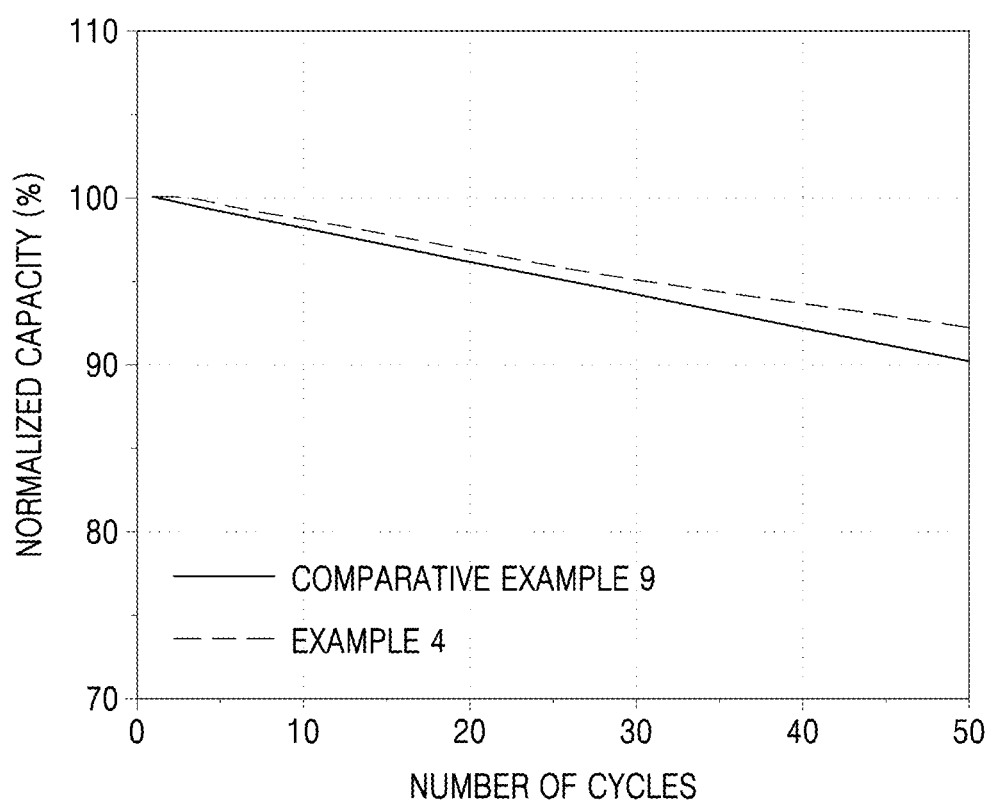
FIG. 8 is a lifespan retention rate graph of half-cells prepared in Example 4 and Comparative Example 9.
Figure 9:
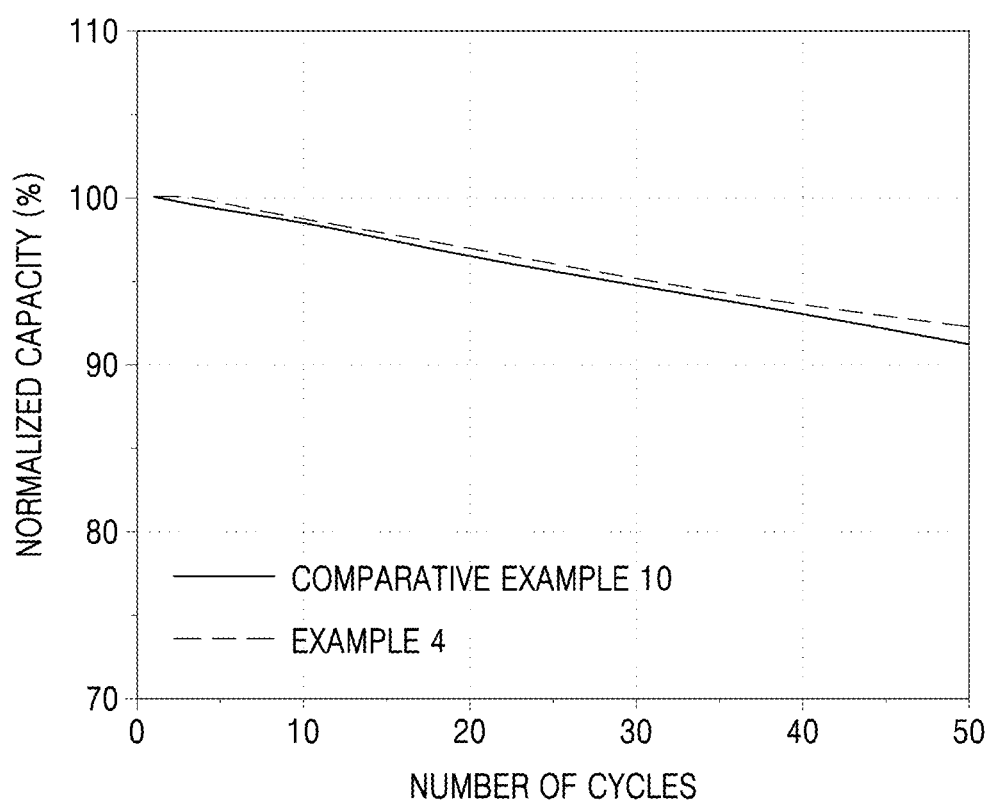
FIG. 9 is a lifespan retention rate graph of half-cells prepared in Example 4 and Comparative Example 10.

Referring to Table 1 and FIGS. 8 and 9, the half-cell of Comparative Example 9 using the cathode active material of Comparative Example 3 not including S element and the half-cell of Comparative Example 10 using the cathode active material of Comparative Example 4 in which F element substituted S element had about 1 to 2% low lifespan retention rate compared to that of the half-cell of Example 4. It is deemed that the binding strength between the transition metal and oxygen increases as the S ions are included in the cathode active material structure, which suppresses the side reactions of the cathode active material and the electrolyte, thereby improving lifespan characteristics.

Figure 10:
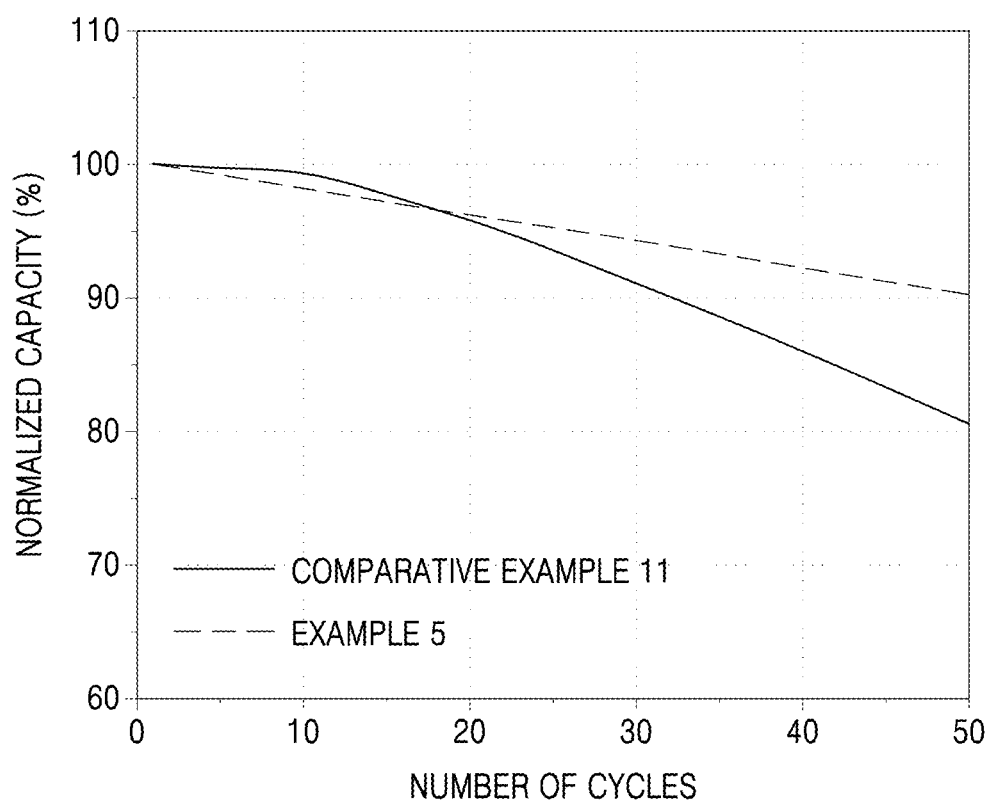
FIG. 10 is a lifespan retention rate graph of half-cells prepared in Example 5 and Comparative Example 11.
Figure 11:
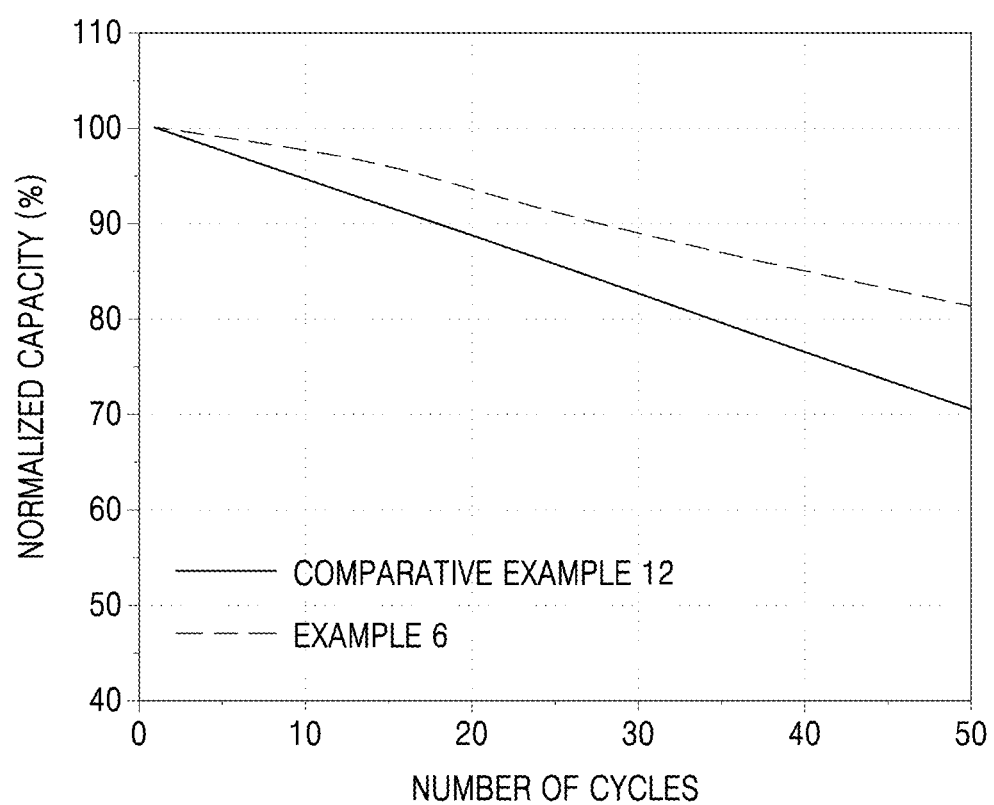
FIG. 11 is a lifespan retention rate graph of half-cells prepared in Example 6 and Comparative Example 12.

Referring to Table 1 and FIGS. 10 and 11, it may be confirmed that the half-cells of Examples 5 and 6 had significantly improved room-temperature lifespan characteristics compared to the half-cells of Comparative Examples 11 and 12 using the cathode active materials of Comparative Examples 5 and 6 not including Zr, W, S, and a coating layer in the cathode active material.

Evaluation Example 2: Evaluation of cathode active material particle diameter

Figure 2:
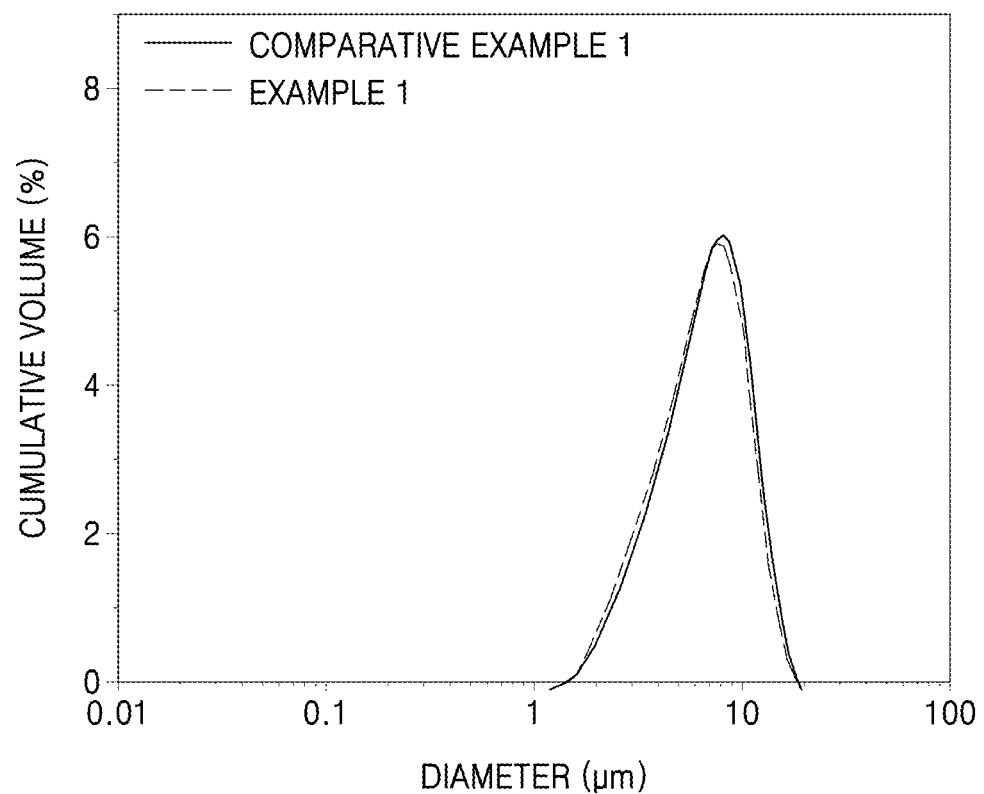
FIG. 2 is a graph that shows particle diameter distribution of the cathode active material of Example 1.

A scanning electron microscope (SEM) image of the appearance of the cathode active material synthesized in Example 1 and Comparative Example 1 was obtained using Verios 460 (available from FEI) and is shown in FIG. 1, and particle distribution of the cathode active material was measured using Cilas 1090 (available from Scinco) and is shown in Table 2 and FIG. 2.

Referring to Table 2 and FIG. 2, although a coating layer is introduced to the cathode active material of Example 1, a particle diameter was not changed, and referring to FIG. 1, considering that difference on the surfaces of the cathode active materials of Example 1 and Comparative Example 1 was not observed, it may be known that a coating layer only existing on the surface of the cathode active material of Example 1 exists in a nanometer size.

TABLE 2

| | $D_{10}$ (µm) | $D_{50}$ (µm) | $D_{90}$ (µm) |
|---|---|---|---|
| Comparative Example 1 | 2.8 | 6.4 | 10.9 |
| Example 1 | 2.8 | 6.3 | 10.9 |

Evaluation Example 3: Evaluation of composition of cathode active material

Figure 3:
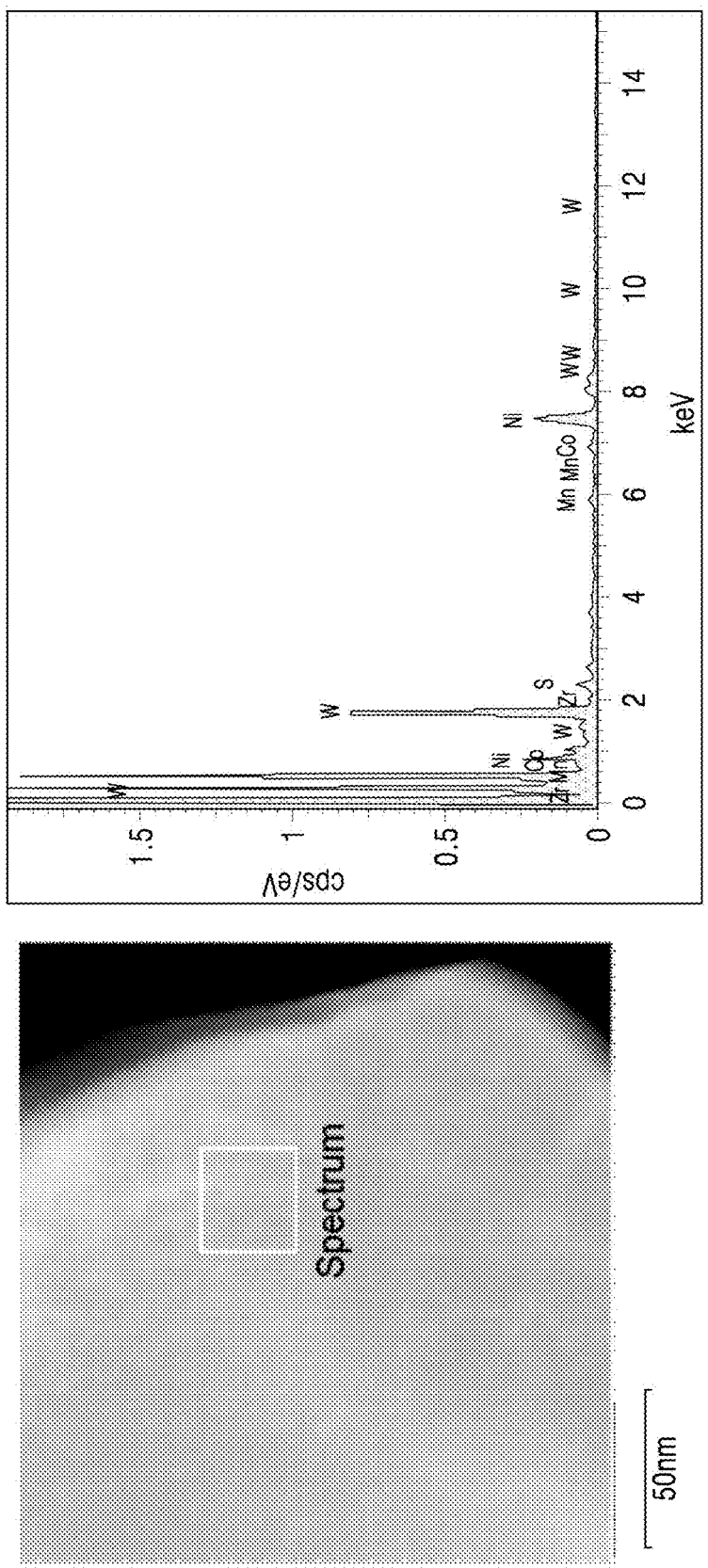
FIG. 3 is a scanning transmission electron microscopy (STEM) image of the cathode active material of Example 1 and the result of energy dispersive X-ray (EDX) analysis of the white box in the STEM image.
Figure 4:
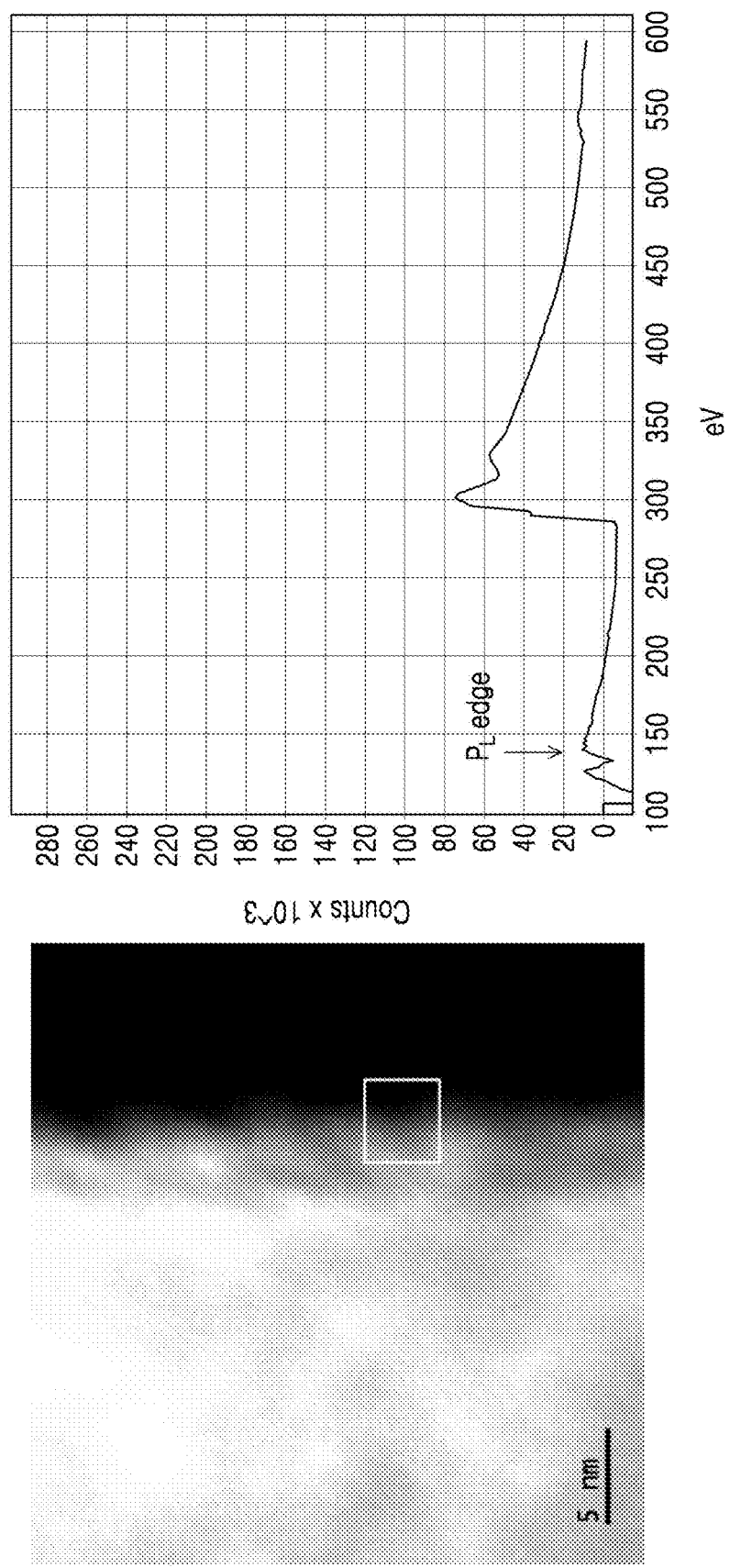
FIG. 4 is an STEM image of the cathode active material of Example 1 and the result of electron energy loss spectroscopy (EELS) analysis of the white box in the STEM image.

Inductively coupled plasma (ICP) analysis was performed on the cathode active materials synthesized in Example 1 and Comparative Example 1 using 700-ES (available from Varian), and the results are shown in Table 3. Also, an EDX analysis on a core part of the cathode active material synthesized in Example 1 was performed, and the result is shown in FIG. 3. Moreover, an EELS analysis for element analysis of a coating layer part of the cathode active material synthesized in Example 1 was performed, and the result is shown in FIG. 4.

Referring to Table 3, the cathode active material of Example 1 includes P at 0.2 mol, and it may be known that this amount does not affect a stoichiometric value of a transition metal or Li. Referring to FIGS. 3 and 4, the existence of elements of S, W, and Zr was confirmed as a result of the EDX analysis on a white box in the core of the cathode active material, but the existence of P element was not confirmed, and a peak was observed near about 130 eV in the EELS analysis on the coating layer marked with a white box in FIG. 4. This is a peak that confirms the existence of P element, and thus it may be known that the coating layer includes P element.

TABLE 3

| Molar ratio | Li | S | Ni | Co | Mn | W | Zr | P |
|---|---|---|---|---|---|---|---|---|
| Comparative Example 1 | 100 | — | 79.9 | 10.4 | 9.7 | — | — | — |
| Example 1 | 100 | 1 | 79.4 | 10.3 | 9.3 | 0.5 | 0.5 | 0.2 |

Evaluation Example 4: Evaluation of Residual Lithium Amount of Cathode Active Material Residual lithium amounts with respect to the cathode active materials synthesized in Example 1 and Comparative Example 1 were measured, and the results are shown in Table 4.

The residual lithium amounts were measured as follows.

10 g of the cathode active material for a lithium secondary battery and deionized water (DIW) were stirred at a rate of 350 rpm for 30 minutes. Then, 40 g of the solution was filtered, and 100 g of DIW was added thereto. The residual lithium amount was measured using a potentiometric titrator (888 Titrando, available from Metrohm).

TABLE 4

|  | $Li_2CO_3$ (wt %) | LiOH (wt %) |
|---|---|---|
| Comparative Example 1 | 1.81 | 0.37 |
| Example 1 | 1.38 | 0.13 |

Evaluation Example 5: XRD Evaluation of Cathode Active Material

Figure 5:
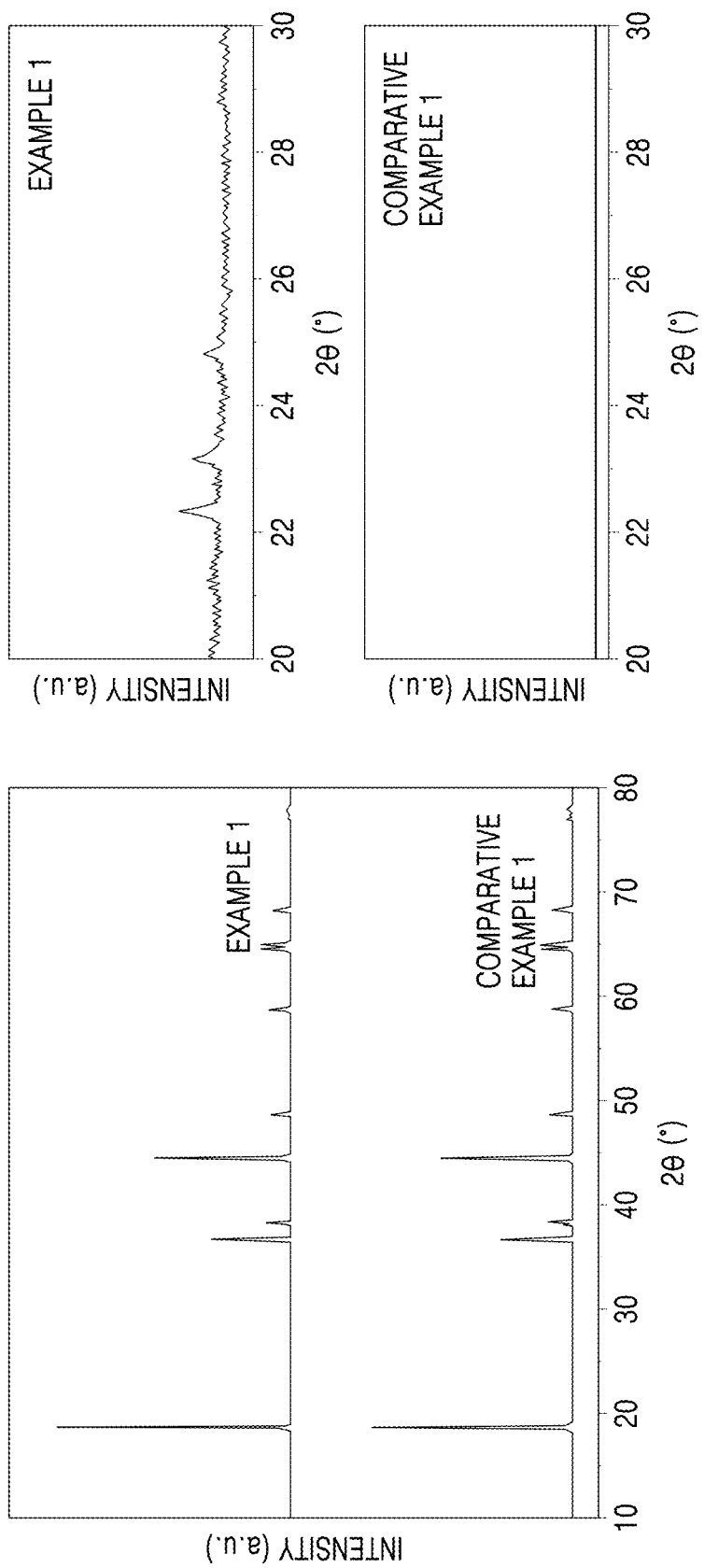
FIG. 5 shows X-ray diffraction (XRD) graphs of Example 1 and Comparative Example 1.

An X-ray diffraction spectrum graph was obtained using D/MAX 2500 V/PC (available from Rigaku) within the angle 2θ ranging from about 10° to about 80° with respect to the cathode active materials synthesized in Example 1 and Comparative Example 1, and the results are shown in FIG. 5.

Referring to FIG. 5, a peak not observed in Comparative Example 1 was observed within the angle 2θ ranging from about 20° to about 25° with respect to the cathode active material synthesized in Example 1, and this is a characteristic peak representing $Li_3PO_4$. Therefore, it is considered that P element reacts with the residual lithium compound existing on a surface of the Ni-based cathode active material and exists in the coating layer as $Li_3PO_4$. Without being bound by theory, it is deemed that the coating layer contains amorphous phosphorus-containing compound including Li, P, and O, which are not observed by XRD.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. A cathode active material comprising:
   a core comprising a compound represented by Formula 1; and
   a coating layer comprising a phosphorus-containing compound disposed on the surface of the core:

is $Li_aZr_\alpha W_\beta M_{1-\alpha-\beta}O_{2-b}S_b$;  Formula 1 wherein, in Formula 1,
   M is at least one transition metal selected from transition metals, except Zr and W; and
   $0.98 \leq a \leq 1.02$, $0 < \alpha \leq 0.005$, $0 < \beta \leq 0.005$, and $0 < b \leq 0.1$.

2. The cathode active material of claim 1, wherein M comprises at least one transition metal selected from Ni, Co, Mn, Al, Mg, V, and Ti.

3. A lithium secondary battery comprising:
   a cathode comprising the cathode active material of claim 2;
   an anode; and
   an electrolyte.

4. The cathode active material of claim 1, wherein M comprises Ni, and
   a molar ratio of Ni atom is greater than about 60 mol %.

5. A lithium secondary battery comprising:
   a cathode comprising the cathode active material of claim 4;
   an anode; and
   an electrolyte.

6. The cathode active material of claim 1, wherein $0 < b \leq 0.01$.

7. A lithium secondary battery comprising:
   a cathode comprising the cathode active material of claim 6;
   an anode; and
   an electrolyte.

8. The cathode active material of claim 1, wherein Formula 1 is represented by one of Formulae 2-1 to 2-3:

is $Li_{a'}Zr_{\alpha'}W_{\beta'}Ni_{1-x'-y'-\alpha'-\beta'}Co_{x'}Mn_{y'}O_{2-b'}S_{b'}$;  Formula 2-1 is $Li_{a''}Zr_{\alpha''}W_{\beta''}Ni_{1-x''-y''-\alpha''-\beta''}Co_{x''}Al_{y''}O_{2-b''}S_{b''}$;  Formula 2-2 is $Li_{a'''}Zr_{\alpha'''}W_{\beta'''}Ni_{1-x'''-\alpha'''-\beta'''}Co_{x'''}O_{2-b'''}S_{b'''}$;  Formula 2-3 wherein, in Formula 2-1,
   $0.98 < a' \leq 1.02$, $0 < \alpha' 0.005$, $0 < \beta' \leq 0.005$, $0 < x' \leq 0.2$, $0 < y' \leq 0.3$, and $0 < b' \leq 0.1$;
   in Formula 2-2,
   $0.98 < a'' \leq 1.02$, $0 < \alpha'' \leq 0.005$, $0 < \beta'' \leq 0.005$, $0 < x'' \leq 0.2$, $0 < y'' \leq 0.05$, and $0 < b'' \leq 00.1$; and,
   in Formula 2-3,
   $0.98 < a''' \leq 1.02$, $0 < \alpha''' \leq 0.005$, $0 < \beta''' \leq 0.005$, $0 < x''' \leq 0.2$, and $0 < b''' \leq 0.1$.

9. The cathode active material of claim 1, wherein the phosphorus-containing compound is crystalline, amorphous, or a combination thereof.

10. The cathode active material of claim 1, wherein a molar ratio of phosphorus (P) in the cathode active material is about 0.2 mol % of the total cathode active material.

11. The cathode active material of claim 1, wherein the phosphorus-containing compound comprises a compound represented by Formula 3:

is $Li_aP_bO_c$;  Formula 3 wherein, in Formula 3, $0 < a \leq 3$, $0 < b \leq 1$, and $0 < c \leq 4$.

12. The cathode active material of claim 1, wherein the coating layer is a continuous coating layer on the surface of the core or a coating layer in the form of an island partially existing on the surface of the core.

13. The cathode active material of claim 1, wherein the cathode active material has a peak at an angle 2θ in a range of about 20° to about 25° of an X-ray diffraction (XRD) spectrum obtained from XRD analysis using a CuKα ray.

14. The cathode active material of claim 1, wherein the cathode active material is a monocrystal.

15. The cathode active material of claim 1, wherein the cathode active material is a single particle.

16. The cathode active material of claim 1, wherein an average diameter ($D_{50}$) of the cathode active material is in a range of about 0.1 μm to about 20 μm.

17. A lithium secondary battery comprising:
   a cathode comprising the cathode active material of claim 1;
   an anode; and
   an electrolyte.

18. A method of preparing a cathode active material, the method comprising:

mixing a lithium precursor, a Zr precursor, a W precursor, a M precursor, a S precursor, and a phosphorus-containing compound precursor to obtain a precursor mixture; and heat-treating the precursor mixture to obtain a cathode active material represented by Formula 1;

$$\text{is } Li_aZr_\alpha W_\beta M_{1-\alpha-\beta}O_{2-b}S_b, \quad \text{Formula 1}$$

wherein, in Formula 1, M is at least one transition metal selected from transition metal except Zr and W; and $0.98 \leq a \leq 1.02$, $0 < \alpha \leq 0.005$, $0 < \beta \leq 0.005$, and $0 < b \leq 0.1$.

19. The method of claim 18, wherein the mixing of the precursors comprises mechanical mixing of the precursors.

20. The method of claim 18, wherein the heat-treating of the precursor mixture comprises first heat-treating and second heat-treating, wherein a heat-treating temperature of the first heat-treating is higher than a heat-treating temperature of the second heat-treating.

* * * * *